US005758566A

United States Patent [19]

Jepsen et al.

[11] Patent Number: 5,758,566

[45] Date of Patent: Jun. 2, 1998

[54] PISTON WITH A SLIDE SHOE FOR A HYDRAULIC PISTON ENGINE

[75] Inventors: Hardy Peter Jepsen, Nordborg; Henry Madsen Møller, Sønderborg, both of Denmark

[73] Assignee: Danfoss A/S, Nordborg, Denmark

[21] Appl. No.: 765,553

[22] PCT Filed: Jun. 27, 1995

[86] PCT No.: PCT/DK95/00270

§ 371 Date: Dec. 23, 1996

§ 102(e) Date: Dec. 23, 1996

[87] PCT Pub. No.: WO96/01948

PCT Pub. Date: Jan. 25, 1996

[30] Foreign Application Priority Data

Jul. 8, 1994 [DK] Denmark ................................ 0822/94

[51] Int. Cl.$^{6}$ ........................................................ F16J 1/14

[52] U.S. Cl. .................................. 92/187; 92/71; 92/248; 417/269; 74/60; 403/130

[58] Field of Search ................................ 92/155, 157, 71, 92/187, 188, 248; 417/269; 74/60; 403/128, 130, 133

[56] References Cited

U.S. PATENT DOCUMENTS

| | | | |
|---|---|---|---|
| 3,125,004 | 3/1964 | White | 92/155 |
| 3,221,564 | 12/1965 | Raymond | 417/269 |
| 3,455,585 | 7/1969 | Raymond | 417/269 |
| 5,013,219 | 5/1991 | Hicks et al. | 417/269 |
| 5,392,693 | 2/1995 | Engel et al. | 92/248 |
| 5,469,776 | 11/1995 | Martensen et al. | 92/170.1 |
| 5,490,446 | 2/1996 | Engel | 92/157 |
| 5,601,009 | 2/1997 | Jepsen et al. | 92/71 |

*Primary Examiner*—Thomas E. Denion

*Attorney, Agent, or Firm*—Lee Mann, Smith, McWilliams Sweeney & Ohlson

[57] ABSTRACT

A piston with a slide shoe is described for a hydraulic piston engine, where the piston is designed with a ball socket, and where the slide shoe is provided with a corresponding ball head, whereby these are connected in a ball-and-socket joint, and where the ball head of the slide shoe is designed as a unit moulded into the ball socket in friction reducing material so that the ball head is captured in the ball socket. Hereby an improved fixation of the moulded-on all head on the slide shoe is achieved.

9 Claims, 2 Drawing Sheets

PISTON WITH A SLIDE SHOE FOR A HYDRAULIC PISTON ENGINE

BACKGROUND OF THE INVENTION

The present invention relates to a piston with a slide shoe for a hydraulic piston engine, where the piston is designed with a ball socket, and where the slide shoe is provided with a corresponding ball head, whereby these are connected in a ball-and-socket joint.

Hydraulic piston engines with such pistons with slide shoes may function for example according to the axial piston or radial piston principle. In both cases are the pistons placed slidingly in a cylinder block, and the slide shoe is held in contact against a guide surface in such a manner that the piston is moved in the cylinder block as a result of a relative movement of the cylinder block in relation to the guide surface, whereby the slide shoe slides across the guide surface.

In order to reduce friction between among other things the piston and the slide shoe, several constructions are known where one of the contact surfaces in the ball-and-socket joint connecting the piston and the slide shoe is made at least partially of a friction-reducing material.

WO Patent Application No. DK 93/00443, now U.S. Pat. No. 5,601,009, describes a piston for a hydraulic piston engine with a slide shoe where the slide shoe is provided with a ball head, which is moulded into a layer of friction-reducing material, and where the piston is provided with a corresponding ball socket, forming a ball-and-socket joint between the piston and the friction-reducing material on the slide shoe.

According to WO Patent Application No. DK 93/00443, the friction-reducing coating may be moulded into the void established between the ball head and the ball socket when the ball head is inserted in the ball socket, for example in a plastic injection moulding tool. In this manner it is achieved in particular that the ball-and-socket joint is installed in a simple manner in the injection moulding process, and that separate installation parts are not required. As a consequence of the thermal shrinking of the moulded-on material, a gap is formed between the friction-reducing material on the ball head and the ball socket on the piston.

The present invention is based on the technology according to WO Patent Application No. DK 93/00443 and is a further development of same.

SUMMARY OF THE INVENTION

The invention is particular in that the material moulded on the slide shoe, which forms the ball head, is of uneven thickness.

Among other things, this leads to a better fixation of the ball head on the slide shoe than is possible by the technology according to WO Patent Application No. DK 93/00443, because the moulded-on material cannot slip on the ball head of the slide shoe, as it may happen in the case of the technology according to WO Patent Application No. DK 93/00443.

In addition, it is often advantageous when piston engines are concerned that there is a gap of some size between the plastic coated surface of the slide shoe and the surface of the ball socket of the piston. In certain situations gap sizes are required which are not immediately obtainable by the process according to WO Patent Application No. DK 93/00443, among other things because the shrinkage properties of the friction reducing material may be limiting to the gap size, depending on the space between the ball head and the ball socket.

According to this invention, the ball head of the slide shoe may be made exclusively from friction reducing material or it may be provided with a support element which protrudes into the ball head, and where in relation to a spherical surface the support element has an irregular shape in relation to a spherical surface.

A particularly low-cost embodiment of the invention is described, where the whole slide shoe is made of a friction-reducing material.

The slide shoe may be a solid construction, or there may be a lubricant or refrigerant duct in the slide shoe and in the piston with a view to providing lubricant or refrigerant to, among other things, the sliding surface of the slide shoe against the guide surface.

By enclosing the support element completely by the moulded-on, friction-reducing material it is prevented as far as possible that adhesion between the moulded-on material and the support body is not ruined.

BRIEF DESCRIPTION OF THE DRAWINGS

Suitable embodiments of the present invention are described in detail in the following with reference to the drawing, where.

DESCRIPTION OF EXAMPLES EMBODYING THE BEST MODE OF THE INVENTION

Figure 1:
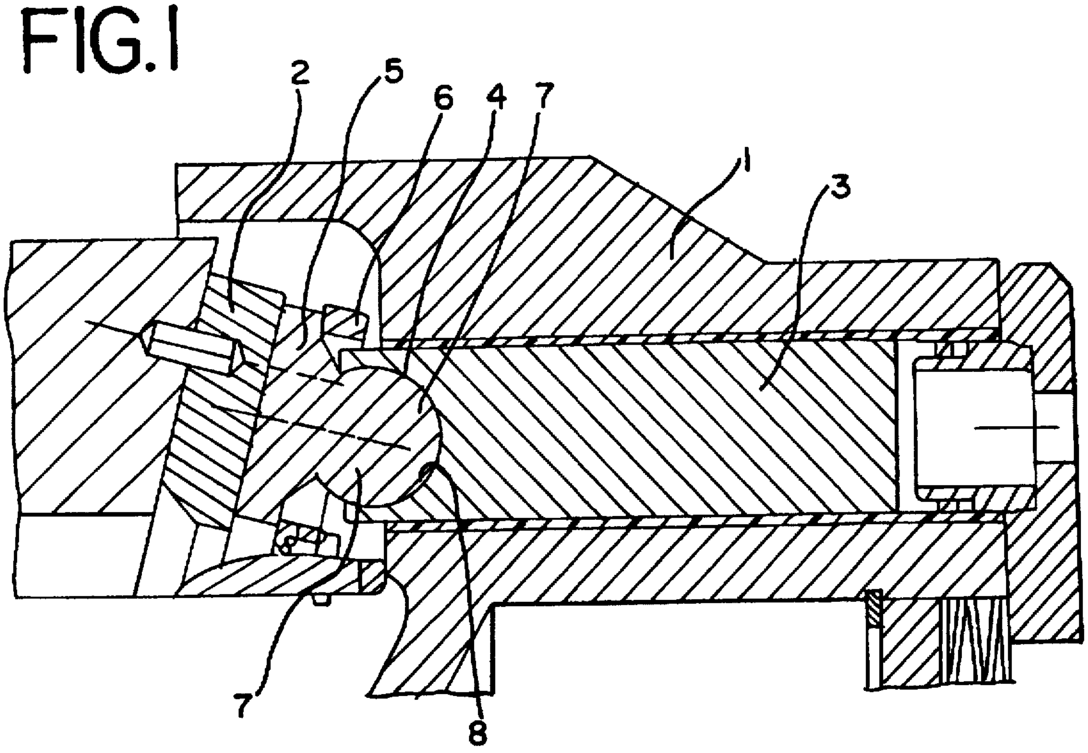
FIG. 1 shows a sectional drawing of part of a hydraulic axial piston engine, with a piston with a slide shoe according to the invention.

FIG. 1 shows a part of a hydraulic piston engine, comprising only the parts required for understanding the present invention.

It shows the hydraulic piston engine comprising a cylinder block 1, which is rotatingly placed facing an oblique disk 2, which is fixed in relation to the housing of the piston engine, not shown.

In the cylinder block 1 a piston 3 is arranged, which by means of a ball-and-socket joint 4 is connected to a slide shoe 5.

The slide shoe 5 is held in contact against the oblique disk 2 by means of a holder 6. The piston engine consequently operates in the manner that the piston 3 and the slide shoe 5, as a consequence of rotation of the cylinder block 1 in relation to the oblique disk 2, will reciprocate in relation to the cylinder block 1.

The piston engine may operate both as a motor and as a pump, and the basic principle of these piston engines is well known, for which reason only the details required for understanding the invention are shown. Incidentally, the invention is also applicable in connection with other types of piston engines, such as radial piston engines, although in the case of these embodiments the present invention is demonstrated only in connection with such axial piston engines.

As shown in FIG. 1, the piston 3 with the slide shoe 5 constitutes a unit, which is connected with a ball-and-socket joint 4. The ball-and-socket joint is constituted by a ball head 7, as a part of the slide shoe 5, and a ball socket 8, arranged in the piston 3. In this manner, the ball head 7 can rotate in the ball socket 8 for the piston 3, whereby a ball-and-socket joint is formed.

According to the present invention the ball head 7 is thus constituted by a unit moulded into the ball socket 8, consisting of a friction reducing material such as plastics.

Among preferred plastics types may be mentioned materials from the group of high-strength thermoplastics based on polyaryletherketones, especially polyetheretherketones, polyamides, polyacetals, polyarylethers, polyethyleneterephthalates, polyphenylenesulphides, polysulphones, polyethersulphones, polyetherimides, polyamideimides, polyacrylates, phenolepoxies such as novolakepoxies or similar substances. Glass, graphite, polytetrafluorethylene or carbon, especially in fibre form, can be used as fillers.

The plastics types mentioned are especially suitable for use in connection with hydraulic piston engines, where water is used as a pressure medium.

In the case of the embodiment shown in FIG. 1 the slide shoe 5 has a solid cross section, which is constituted entirely by the moulded plastics material. Thus the entire slide shoe is formed for instance by injection moulding, where part of the mould cavity in which the slide shoe 5 is formed, is constituted by the piston 3 at the ball socket 8. The rest of the mould cavity may be constituted by the injection moulding tool, for example.

In this manner it has become extremely simple to produce such a piston with a slide shoe, because subsequent mounting and handling processes are reduced to an absolute minimum.

Figure 2:
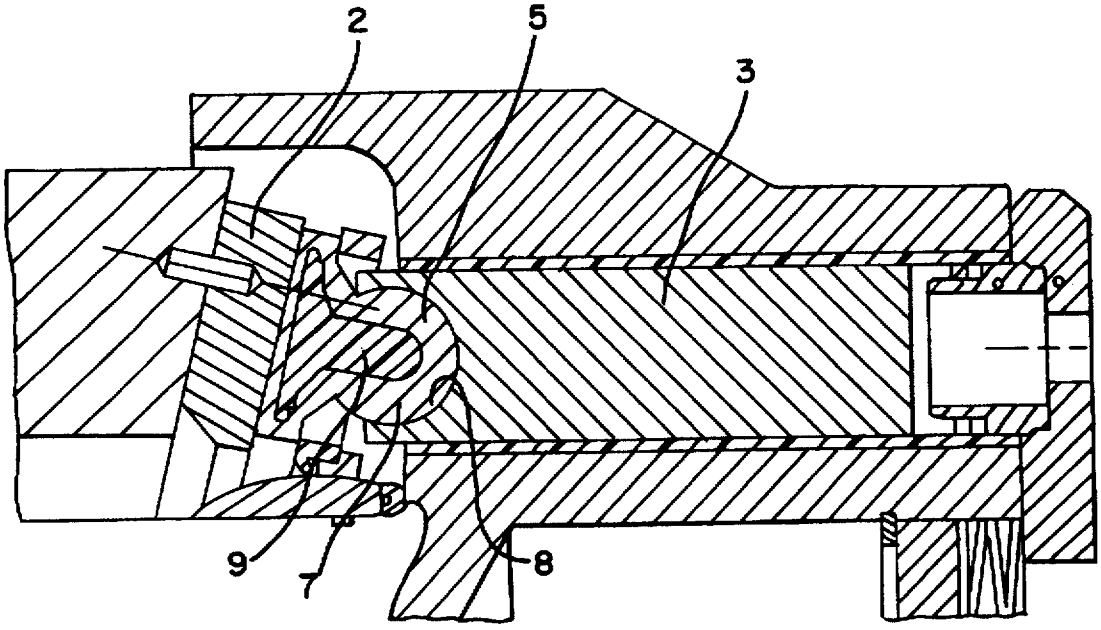
FIG. 2 shows in the same manner as in FIG. 1 a second embodiment of a piston with a slide shoe according to the invention.

FIG. 2 shows alternatively a second embodiment of a piston with a slide shoe according to the invention, where the slide shoe has a reinforcing insert 9, which is designed to reinforce the structure of the slide shoe. In this manner, such an insert 9 will suitably extend along the contact surface of the slide shoe 5 against the oblique disk 2, and possibly extend up into the ball head 7, whereby the ball head 7 is reinforced. According to the invention, however, the part of the reinforcing element 9 which extends into the ball head, must have an irregular shape in relation to a spherical surface, and for example the cylindrical shape shown in FIG. 2. In this manner the reinforcing element 9 efficiently retains the moulded-on ball head 7, because the moulded-on ball head 7 is retained between the ball socket 8 on the piston 3 and the reinforcing element 9 by geometrical locking.

Figure 3:
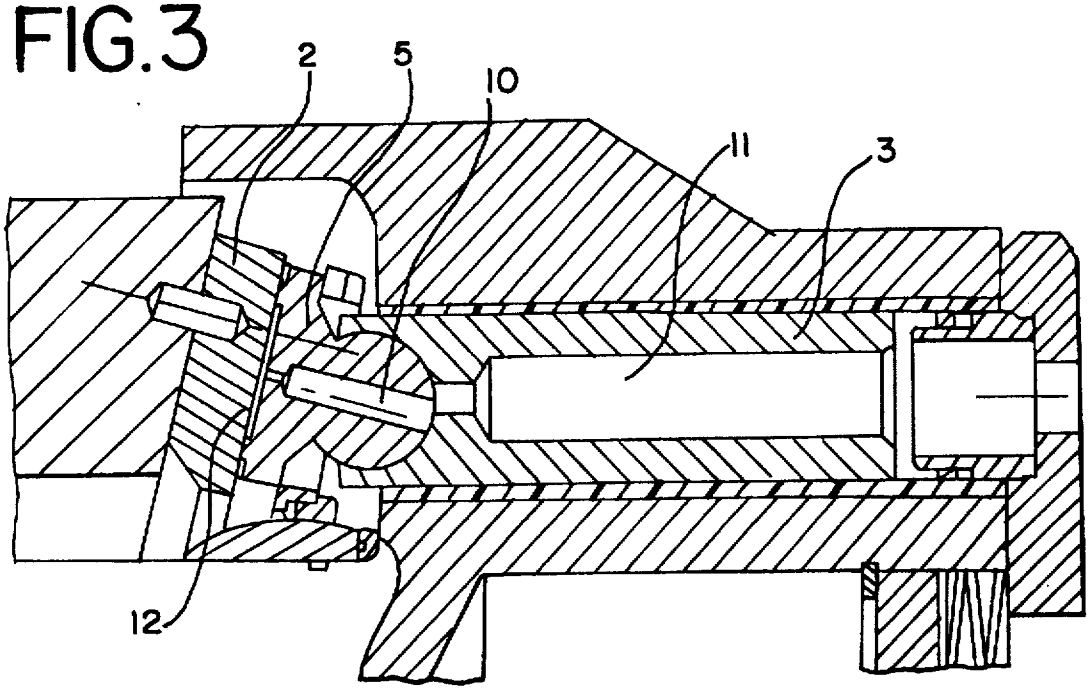
FIG. 3 shows in the same manner as FIG. 1 a third embodiment of a piston with a slide shoe according to the invention.

FIG. 3 shows a third alternative embodiment, where the slide shoe 5 is provided with a duct 10, which is connected to the pressure side of the piston via a duct 11 in the piston 3. The duct 10 thus discharges at the contact surface between the slide shoe 5 and the oblique disk 2, whereby hydraulic relief can be established of this sliding surface. In the embodiment shown, the relief is established with a pressure pocket 12.

The embodiment shown in FIG. 3 is made entirely of plastic in the same manner as is the case in the embodiment shown in FIG. 1.

Figure 4:
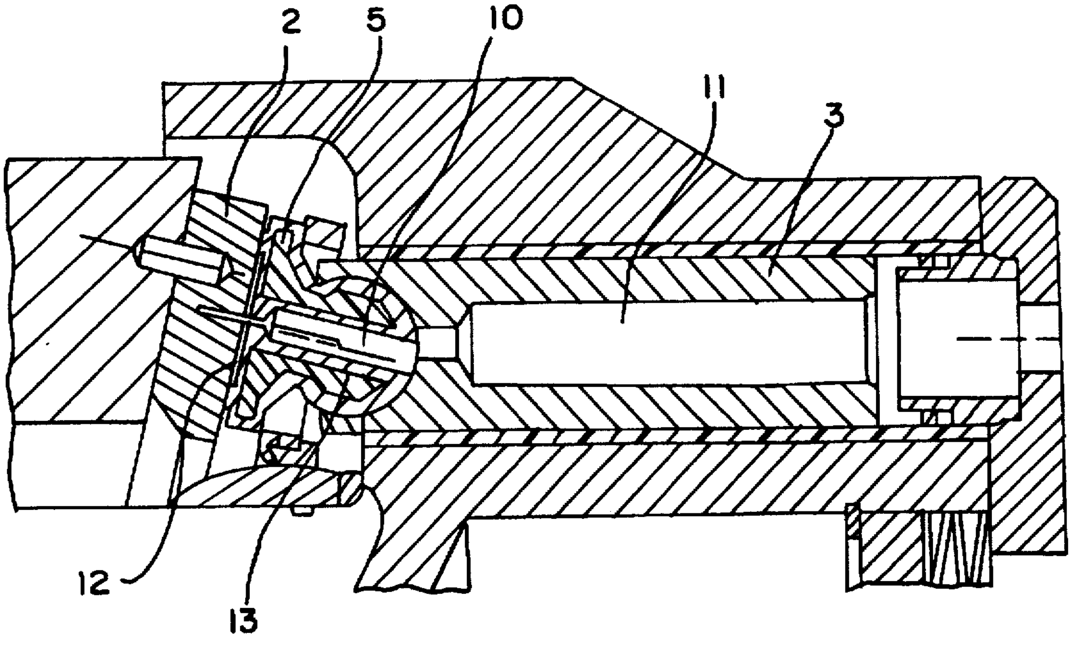
FIG. 4 shows in the same manner as in FIG. 1 a fourth embodiment of a piston with a slide shoe according to the invention.

On the other hand, FIG. 4 shows a fourth embodiment, where in the same manner as in FIG. 1, a duct 10 has been arranged in the slide shoe 5, to obtain hydraulic relief of the slide surface between the slide shoe 5 and the oblique disk 2. However, a reinforcing element 13 is shown here which is tubular, so that the duct 10 can extend through the element. The function of the reinforcing element 13 is the same as of the reinforcing element 9 according to FIG. 2. However, another embodiment is shown at the reinforcing element 13, whereby the reinforcing element 13 has an irregular shape in relation to a spherical surface.

It is clear that the embodiments of the invention shown here can be varied in many ways within the basic idea of the invention. Thus the reinforcing elements in the ball heads may have many different shapes, which deviate from a spherical surface, whereby in any case an improved fixation is achieved of the ball head moulded on to the slide shoe. Nor do the reinforcing elements have to be completely embedded in moulding material, as it is the case with the embodiments shown.

We claim:

1. A piston with a slide shoe for a hydraulic piston engine, the piston having a ball socket, and the slide shoe having a corresponding ball head, the ball socket and the ball head being connected in a ball-and-socket joint, the ball head of the slide shoe being moulded as a unit into the ball socket in friction reducing material so that the ball head is captured in the ball socket.

2. A piston with a slide shoe according to claim 1, in which only the ball head on the slide shoe comprises the friction reducing material moulded into the ball socket of the piston.

3. A piston with a slide shoe according to claim 2, in which the slide shoe consists entirely of the friction reducing material.

4. A piston with a slide shoe according to claim 1, in which the slide shoe is solid.

5. A piston with a slide shoe according to claim 4, in which a support element is moulded into the slide shoe.

6. A piston with a slide shoe according to claim 1, including a duct formed in the piston extending from an outer surface of the ball socket to a pressure side of the piston, and including a through bore in the slide shoe extending from the duct to a sliding surface of the slide shoe.

7. A piston with a slide shoe according to claim 6, including a support element moulded into the slide shoe and extending around the through bore in the slide shoe.

8. A piston with a slide shoe according to claim 5, in which the support element extends into the ball head on the slide shoe, and the support element having a part extending into the ball head with an irregular shape in relation to a spherical surface.

9. A piston with a slide shoe according to claim 5, in which the support element is completely surrounded by friction reducing material.

* * * * *